G. E. HEARN.
FASTENING DEVICE.
APPLICATION FILED JULY 9, 1915.

1,206,110.

Patented Nov. 28, 1916.

Witnesses.
James H. Thurston
Ellen C. Alford

Inventor.
George E. Hearn,
By Wilmarth H. Thurston,
Attorney

UNITED STATES PATENT OFFICE.

GEORGE E. HEARN, OF PROVIDENCE, RHODE ISLAND, ASSIGNOR TO ROBERT L. MOOR-HEAD, OF BROOKLYN, NEW YORK, DOING BUSINESS UNDER THE NAME OF R. L. MOORHEAD & CO., OF PROVIDENCE, RHODE ISLAND.

FASTENING DEVICE.

1,206,110.  Specification of Letters Patent.  Patented Nov. 28, 1916.

Application filed July 9, 1915. Serial No. 38,849.

*To all whom it may concern:*

Be it known that I, GEORGE E. HEARN, of the city and county of Providence and State of Rhode Island, have invented certain new and useful Improvements in Fastening Devices; and I do hereby declare the following specification, taken in connection with the accompanying drawings, forming a part of the same, to be a full, clear, and exact description thereof.

The invention relates to a fastening device which is particularly designed for use in joining the ends of necklaces, but is equally applicable to other articles in which a clasp or coupling is employed for joining the ends or parts thereof.

The principal object of the invention is to produce a fastening device which is provided with means for preventing the disengagement of the parts of the fastening device when the same becomes accidentally opened or unfastened.

To this end the invention consists in the novel construction, arrangement and combination of parts hereinafter described and more particularly set forth in the claims.

In describing the invention in detail reference will be had to the accompanying drawings, in which—

Figure 1:
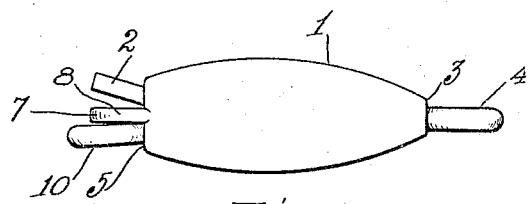
Figure 2:
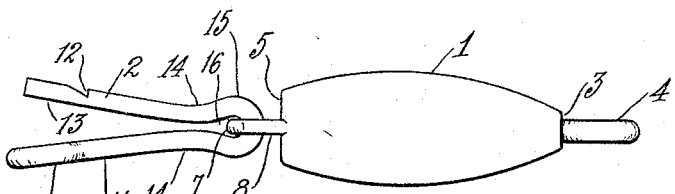
Figure 3:
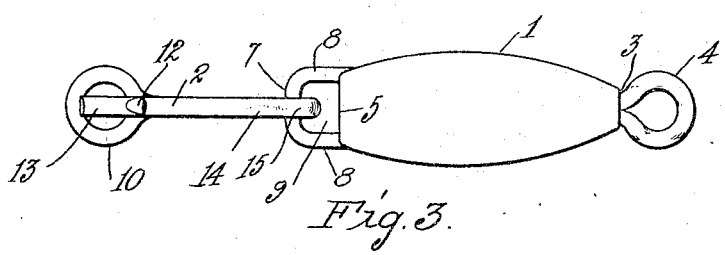
Figure 4:
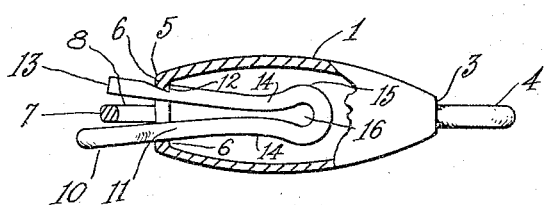

Figure 1 is a perspective side view of my improved fastening device in closed position. Fig. 2 is a similar view in open position. Fig. 3 is a top view in open position. Fig. 4 is a side view in closed position and partly in section.

Referring to the drawings, my improved fastening device comprises a tubular or barrel member 1 and a V-shaped hook member 2. The barrel member 1 is provided with a closed end 3 having an attaching ring 4 upon the exterior thereof and with an open end 5 having an inwardly extending annular flange 6. Secured to or made integral with the open end portion 5 of the barrel member 1 is a central bridge member 7 having legs 8 for supporting said bridge member 7 away from the end portion to form the opening 9.

The V-shaped hook member 2 is provided with an attaching ring 10 at the free end of one of its legs 11 and a notch 12 upon the exterior of the other of its legs 13 and adjacent the free end thereof. The legs of the V-shaped hook member 2 are provided with an inwardly bent portion 14 near their joined ends so as to make the space between them smaller than the diameter of the bridge-member 7 and with an enlarged closed end portion 15 to form an enlarged opening 16, as shown in Figs. 2 and 4.

In closing the fastening device, the leg 13 of the hook member 2 is passed through the opening 9 between the bridge-member 7 and the open end of the barrel-member 1. The hook-member is then brought into longitudinal alinement with the barrel-member, as shown in Fig. 2, and pushed into said barrel-member 1. As the hook-member is forced into the barrel-member the free ends of the legs 11 and 13 are forced closer together, thereby setting up a spring action in said legs, so that when the hook-member is inserted a certain distance the leg 13 will be sprung outward so that the annular flange 6 will engage the notch 12 and lock the members in closed position. If now the members of the fastening device become accidentally unlocked and the hook member 2 pulled out of the barrel-member 1, the bridge-member 7 will pass between the inwardly bent portions 14 of the legs 11 and 13 and into the enlarged opening 16, as shown in Figs. 2 and 3. It will thus be seen that the hook-member 2 will be securely held and locked in engagement with the barrel-member 1, even when the members are in open position. It will be apparent that the above construction of fastening device when used upon a necklace will prevent the necklace from falling from the person, if it should become accidentally unfastened, and becoming lost or damaged.

What I claim as my invention and desire to secure by Letters Patent is:

1. An article of the character described comprising a barrel-member provided with an open end and a bridge-member extending across said open end, and a hook-member provided with means adapted to hold said bridge-member in engagement with said hook-member.

2. An article of the character described comprising a barrel-member provided with an open end and a bridge-member extending across said open end, and a V-shaped hook-member provided upon each leg with means for holding said bridge-member in engagement between the legs of said hook-member when the barrel-member and hook-member are in open position.

3. An article of the character described comprising a barrel-member provided with an open end and a bridge-member extending across said open end, and a V-shaped hook-member having the legs thereof provided with an inwardly bent portion and an enlarged opening adjacent said inwardly bent portions.

GEORGE E. HEARN.

Witnesses:
W. H. THURSTON,
J. H. THURSTON.

Copies of this patent may be obtained for five cents each, by addressing the "Commissioner of Patents, Washington, D. C."